Aug. 31, 1954
D. O. NELSON ET AL
2,687,658
SELECTING CLUTCH RESPONSIVE TO DIRECTION OF ROTATION
Filed May 11, 1953
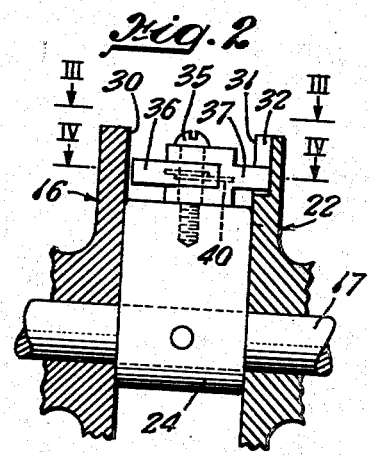
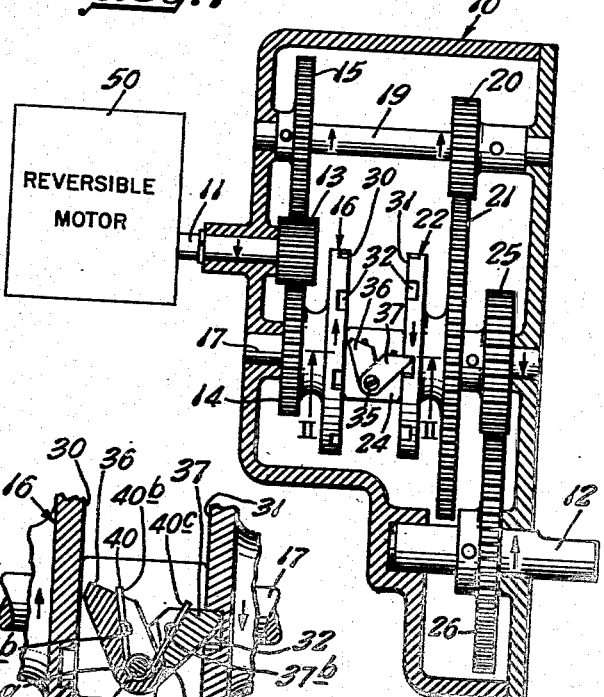
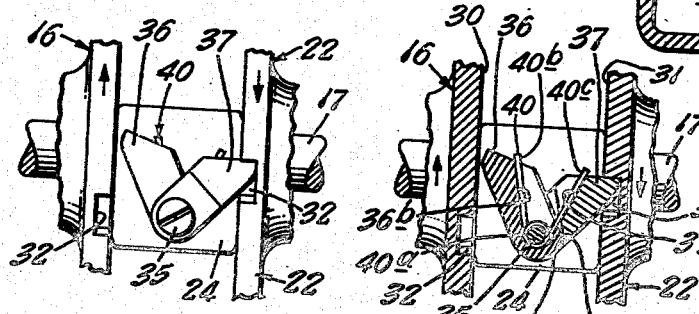
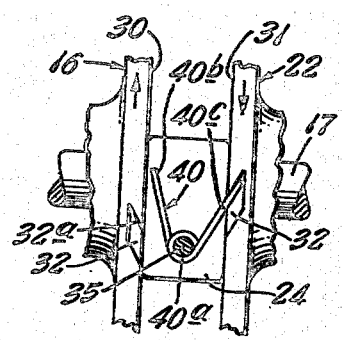
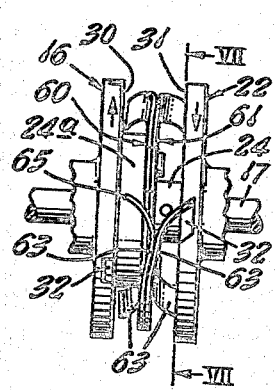
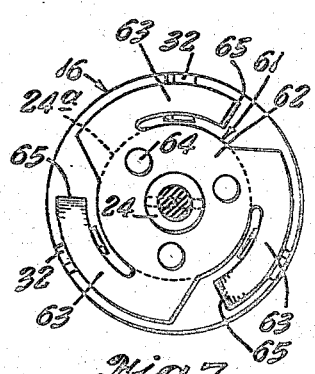
INVENTORS
D. O. Nelson
C. E. Wallquist
BY *Woodburg*
ATTORNEY Patented Aug. 31, 1954

2,687,658

UNITED STATES PATENT OFFICE 2,687,658

SELECTING CLUTCH RESPONSIVE TO DIRECTION OF ROTATION

Donald O. Nelson, Los Angeles, and Clare E. Wallquist, Burbank, Calif., assignors to Bendix Aviation Corporation, North Hollywood, Calif., a corporation of Delaware Application May 11, 1953, Serial No. 354,364

6 Claims. (Cl. 74—812)

This invention relates to speed changing gear boxes or transmissions and more particularly to a gear box incorporating a special clutch construction whereby the speed change in an output shaft is effected by reversing the direction of rotation of the input shaft.

An object of the invention is to provide a simple, inexpensive and practical gear box structure for shifting speed in response to reversal of the direction of rotation of the input shaft.

Other more specific objects and features of the invention will appear from the description to follow, with reference to the drawing.

In the drawing:

Fig. 1 is a longitudinal section through a gear box in accordance with the invention;

Fig. 2 is a detail section taken in the plane II—II of Fig. 1;

Fig. 3 is a detail plan view taken in the plane III—III of Fig. 2;

Fig. 4 is a detail sectional view taken in the plane IV—IV of Fig. 2;

Fig. 5 is a detail plan view similar to Fig. 3 but showing a modified construction;

Fig. 6 is a detail view similar to Figs. 3 and 5 but showing a second modified construction; and Fig. 7 is a view taken in the plane VII—VII of Fig. 6.

Referring to Fig. 1, the gear box therein disclosed comprises a casing 10 having an input or drive shaft 11 and an output or driven shaft 12. The function of the mechanism within the casing 10 is to rotate the driven shaft 12 at one speed in one direction in response to rotation of the drive shaft 11 in one direction and to rotate the driven shaft 12 at a different speed but in the same direction as before in response to rotation of the drive shaft 11 in the reverse direction.

The drive shaft 11 is adapted to be connected to the driven shaft 12 through either of two gear trains having different ratios, by a clutch mechanism that is responsive to the direction of rotation of the input shaft 11 to select the desired gear train.

Thus the input shaft 11 carries a pinion 13 which meshes with gears 14 and 15. The gear 14 is formed integral with a clutch drive member 16 which is freely rotatable on a shaft 17. The gear 15 is pinned to a shaft 19 for rotation therewith, the shaft 19 being journalled in the casing 10 and carrying a second gear 20 which meshes with a gear 21 formed integrally with a second clutch drive member 22 and also freely rotatable on the shaft 17. The clutch includes a driven member 24 which is secured to the shaft 17 for rotation therewith. Shaft 17 is also pinned to a gear 25 that meshes with a gear 26 on the output shaft 12.

It will be observed that if the clutch drive member 16 is connected to the driven member 24, the input shaft 11 drives the output shaft 12 through a relatively small speed reduction through the gears 13, 14, 25 and 26 respectively, and two reversals of direction are produced so that the output shaft 12 rotates in the same direction as the input shaft 11.

On the other hand, when the clutch driving member 22 is connected to the clutch driven member 24, the shaft 11 drives the shaft 12 through the gears 13, 15, 20, 21, 25 and 26, producing a relatively large speed reduction. Furthermore, since there are three reversals of direction the output shaft 12 rotates in direction opposite to that of the input shaft 11.

As shown in Figs. 1, 2, 3, and 4, the clutch drive members 16 and 22 have juxtaposed end faces 30 and 31 respectively, each of which has axially extending groove-like recesses 32. The drive members 16 and 22 are maintained in separated relation by the clutch driven member 24 which is in the form of a hub pinned to the shaft 17. This hub has projecting therefrom a pivot screw 35 which extends radially with respect to the axis of the shaft 17 and rotatably supports a pair of pawls 36 and 37, which pawls are adapted to engage the recesses 32 in one or the other of the faces 30, 31 to effect the driving connection.

The pawls 36 and 37 lie approximately in a plane perpendicular to the radius from the shaft 17 and the two pawls extend in diverging relation to each other in this plane. As shown in Figs. 1, 2, 3 and 4, the pawls are in an extended or expanded position in which when one of the pawls, for instance the pawl 37 is engaging a recess in its associated drive member, the other pawl is held clear of its associated drive member. The maximum divergence is determined by abutment of cooperating shoulders 36a and 37a on the pawls 36 and 37 respectively. The pawls are maintained in expanded position shown in Fig. 4 by a torsion spring 40 comprising a helical portion 40a encircling the pivot screw 35 and two end portions 40b and 40c respectively extending therefrom and bearing against the adjacent walls 36b and 37b of the pawls 36 and 37 respectively, thereby urging the pawls apart, but permitting them to be deflected toward each other for a purpose to be hereinafter explained.

The mechanism so far described functions as follows: Let it be assumed that the shaft 11 is driven (as by a motor 50) in the direction indicated by the arrow. This rotates the pinion 13 in the same direction and the gears 15 and 20 in the opposite direction. However the gear 20 drives the gear 21 in the opposite direction so that the clutch drive member 22 secured to the gear 21 rotates in the same direction as the shaft 11. As shown in Fig. 1 this causes one of the recesses 32 in the face 31 of member 22 to engage the pawl 37 and thereby drive the driven clutch member 24, the shaft 17, and the gear 25 with the gear 21. This causes the shaft 12 to rotate in direction opposite to the shaft 11, as indicated by the arrow. At this time the other clutch driving member 16 is rotating in the opposite direction, but this does not affect the drive because the pawl 36 is positioned clear of the face 30 of the clutch drive member 16.

Now let it be assumed that the motor 50 is reversed to thereby reverse the direction of rotation of the input shaft 11 and all of the gears and shafts permanently coupled thereto. The reversal of the clutch drive member 22 disengages the pawl 37 from the recess 32 in the face 31 and causes it to ride onto the face 31. This rocks the pawls 36 and 37 as a unit about the pivot screw 35 until the pawl 36 bears against the face 30 of the other clutch drive member 16. Final movement of the pawl 37 out of the recess 32 contracts the pawls 36 and 37 toward each other, separating the abutting shoulders 36a and 37a, and deflecting the spring 40. Since the clutch drive member 16 reversed its direction simultaneously with the reversal of the member 22, it now moves in such direction as to cause the pawl 36 to drop into and engage one of the recesses 32 in the face 30, thereby rotating the pawl unit and the clutch driven member 24 with it to rotate the output shaft 12 at a higher speed (relative to the speed of the input shaft 11) than before. However, since the clutch driven member 24 is always driven in the same direction irrespective of which of the clutch drive members 16 or 22 drives it, the output shaft 12 runs in the same direction as before.

The mechanism described is quiet in operation because whenever one of the pawls 36 or 37 is engaged in driving relation with its associated drive member 16 or 22, the other pawl is held clear of its associated face. This results from the fact that the spacing between the pawls in their expanded position exceeds the spacing between the faces 30 and 31 by a distance less than the depth of the recesses 32.

Various departures from the exact construction shown in Figs. 1 to 4 inclusive may be made while still obtaining the advantages of the invention. Two such modifications are shown in Fig. 5 and in Figs. 6 and 7 respectively.

Fig. 5 shows a very simple arrangement in which the ends 40b and 40c of the spring 40 themselves constitute the pawls. With this arrangement it is desirable to make the driving edges or faces 32a of the recesses 32 reentrant so that when the end 40b or 40c of the spring is engaged in the recess, it is carried to the bottom thereof to thereby positively carry the other spring end clear of its associated face.

In the modification shown in Figs. 6 and 7 the pawls are constituted by leaf-spring elements 60 and 61 respectively. Thus as shown in Fig. 7 the element 61 comprises a central portion 62 and three arm portions 63 which extend in a generally arcuate direction. Each arm portion 63 constitutes a resilient leaf spring element which is secured at one end to the central portion 62, the latter being secured as by rivets 64 to the end face of a flange 24a on the driven hub member 24. The leaf spring element 63 of each of the elements 60 and 61 is prestressed to press against its opposite leaf on the other member through a portion of its length, and at its outer end diverges from the other element to form ends 65 which constitute the pawls. As shown in Figs. 6 and 7 there are three of the resilient leaf spring elements provided symmetrically distributed about the axis of rotation. However this is not essential, and if desired a lesser number may be employed.

The structure of Figs. 6 and 7 functions similarly to that of Fig. 5. The outer ends 65 of the leaf-spring elements, which constitute the pawls, are spaced apart a distance greater than the spacing between the faces 30 and 31 by an amount less than the depth of the recesses so that, as shown in Fig. 6, when one pawl is engaged in a recess, its opposite pawl is held clear of its associated face.

Summarizing, it will be observed that in all of the embodiments illustrated, the invention resides in the combination of the following elements:

A. A pair of rotatably supported spaced coaxial drive members 16 and 22 having juxtaposed end faces 30 and 31 containing radial recesses 32.

B. Means for selectively rotating each drive member in either direction and simultaneously rotating the other drive member in the opposite direction, which includes the gears 13, 14, 15, 20, and 21.

C. A rotary driven member 24 coaxial with and positioned between the end faces 30 and 31 of the drive members 16 and 22.

D. A pawl unit comprises two diverging pawls (36 and 37 in Fig. 1, 40b and 40c in Fig. 5, and 65, 65 in Fig. 6) symmetrically positioned between the end faces 30 and 31 approximately in a plane perpendicular to a radius from the axis with one pawl adjacent one face and the other pawl adjacent the other face, and means (25 in Figs. 1 and 5, and 63 in Figs. 6 and 7) supporting the pawls on the driven member for rotary movement therewith and swinging movement relative thereto toward and away from their adjacent faces 30 and 31.

E. Means (the spring 40 in Fig. 1, the helical portion 40a of the spring in Fig. 5, and the portion 63 of the leaf springs in Fig. 7) yieldably supporting said pawls with respect to each other for movement between a distorted contracted position in which they are spaced apart a distance equal to the spacing between the faces 30 and 31 and a normal expanded position in which they are spaced apart a distance exceeding the spacing between the faces 30 and 31 by an amount less than the depth of the recesses 32 whereby engagement of either pawl in a recess of the adjacent face holds the other pawl clear of its adjacent face and disengagement of either pawl from a recess urges the other pawl against its adjacent face for engagement in a recess therein in response to rotation of that face.

Although for the purpose of explaining the invention, a particular embodiment thereof has been shown and described, obvious modifications will occur to a person skilled in the art, and we do not desire to be limited to the exact details shown and described.

We claim:
1. A mechanism of the type described com- prising: a pair of rotatably supported, spaced, coaxial drive members having juxtaposed end faces containing radial recesses; means for selectively rotating each drive member in either direction and simultaneously rotating the other drive member in the opposite direction; a rotary driven member coaxial with and positioned between said end faces of said drive members; a pawl unit comprising two diverging pawls symmetrically positioned between said end faces approximately in a plane perpendicular to a radius from said axis with one pawl adjacent one face and the other pawl adjacent the other face, and means supporting said pawls on said driven member for rotary movement therewith and swinging movement relative thereto toward and away from their adjacent faces; means yieldably supporting said pawls with respect to each other for movement between a distorted, contracted position in which they are spaced apart a distance equal to the spacing between said faces and a normal, expanded position in which they are spaced apart a distance exceeding said spacing between said faces by an amount less than the depth of said recesses, whereby engagement of either pawl in a recess of the adjacent face holds the other pawl clear of its adjacent face, and disengagement of either pawl from a recess urges the other pawl against its adjacent face for engagement in a recess therein in response to rotation of that face.

2. A mechanism according to claim 1 in which said means supporting said pawls on said driven member comprises pivot means extending radially from said driven member and pivotally engaging said pawls.

3. A mechanism according to claim 2 in which said means yieldably supporting said pawls with respect to each other comprises cooperating abutting shoulders on said respective pawls limiting divergence thereof to said normal expanded position, and spring means urging said pawls toward said expanded position.

4. A mechanism according to claim 2 including a wire spring means comprising a helical portion encircling said pivot means and end portion extending substantially radially from said helical portion, said end portion constituting said pawls and said helical portion constituting said means for yieldably supporting said pawls with respect to each other.

5. A mechanism according to claim 1 in which said pawls and said means supporting said pawls consist of a pair of resilient leaf spring elements secured to and extending from said driven member, said elements having supporting portions secured together in side-by-side relation and pawl portions diverging from each other.

6. A mechanism according to claim 1 in which said recesses have re-entrant side walls facing the ends of said pawls whereby engagement of a pawl with a recess guides the end of the pawl to the bottom of the recess.

No references cited.